Oct. 9, 1928.
V. MAUCK
1,687,101
GAS WATER HEATER
Filed March 31, 1926   2 Sheets-Sheet 2
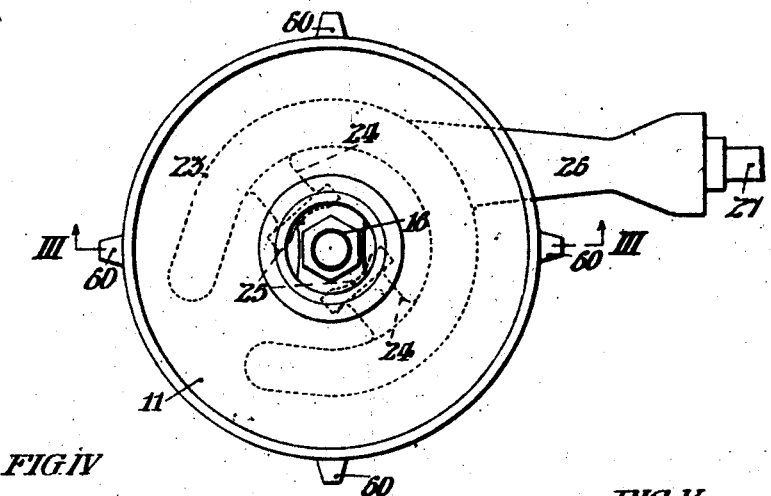
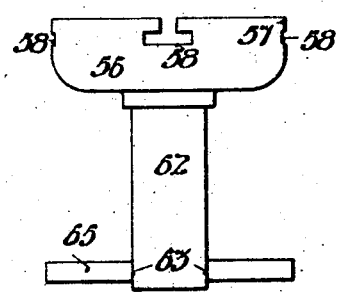
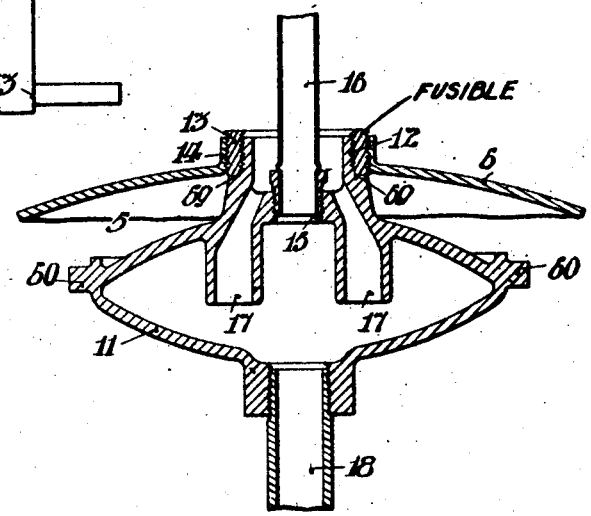
INVENTOR:
VICTOR MAUCK, Patented Oct. 9, 1928.

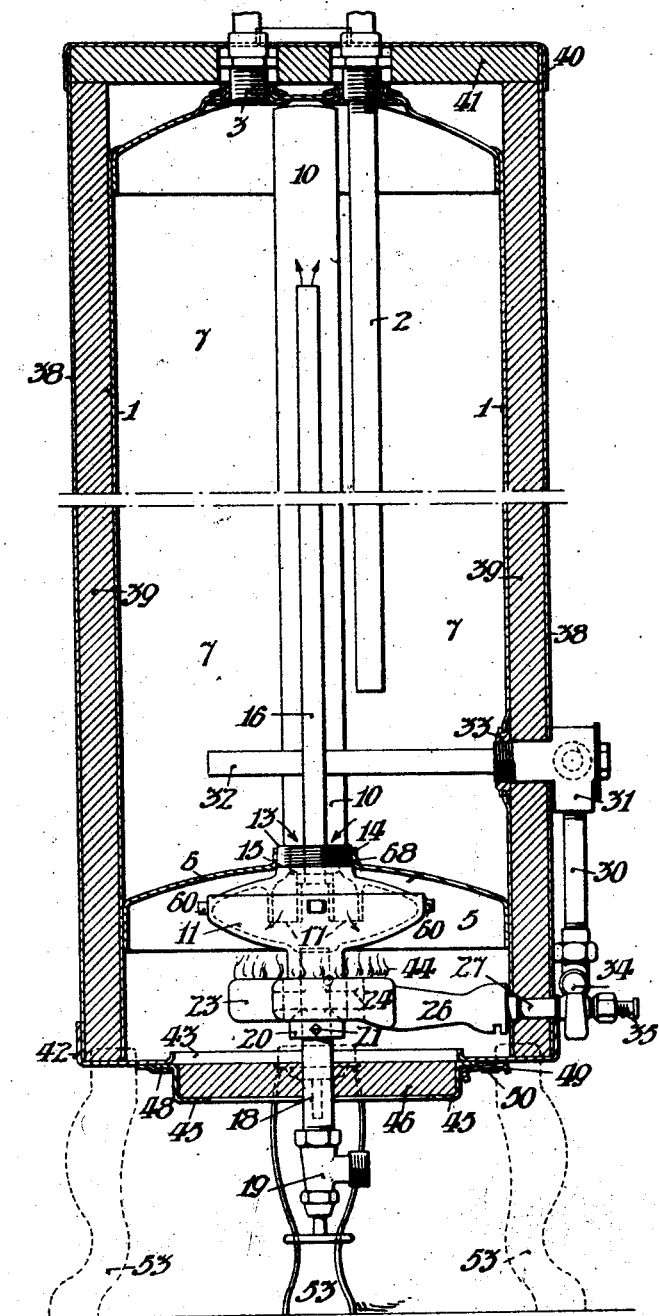

1,687,101

UNITED STATES PATENT OFFICE.

VICTOR MAUCK, OF MERION, PENNSYLVANIA.

GAS WATER HEATER.

Application filed March 31, 1926. Serial No. 98,790.

My invention relates to such a heater adapted to be included in a house water supply system and comprising a container which is a hot water reservoir. Although the heater which I have chosen for illustration is of the specific form shown in my copending application Serial No. 752,037 filed November 24, 1924 for Letters Patent of the United States, and which is constructed and arranged to automatically regulate and maintain a predetermined temperature of the water stored in said reservoir, by thermostatically operative means; the essential feature of my invention herein claimed comprises means for facilitating the removal and replacement with respect to any form of heater, of what is termed in the trade a "water spreader" to wit, a water container which extends immediately above the gas burner so as to be heated by the flames from the latter and which is adapted to cause the water to spread and circulate therein in contact with the hot wall of the spreader; the latter having at its upper portion an axial tubular neck provided with a screw thread for engagement with the bottom of the reservoir and through which the water passes to and from the interior of the spreader. Of course, the efficiency of such a heater is dependent upon the rapidity and facility with which heat is transmitted through the lower wall of the spreader, and it has been found in practice that practically every municipal water supply includes mineral matter which is precipitated and deposited in such a spreader and forms a heat insulating coating upon the interior of the spreader which materially lessens its efficiency. The rapidity with which such deposit is made is of course dependent upon the nature and quantity of the mineral matter carried by the water and, in some portions of the United States, for instance, in Wisconsin, it is necessary to maintain such a heater economically operative, to remove the incrusted spreaders and replace them with new ones at intervals not exceeding six weeks. Therefore, a very considerable item in the cost of maintenance of such heaters is the labor involved in effecting such removals and replacements. The amount of labor required is far in excess of that required to initially assemble the parts in question; because both the spreader and the bottom of the reservoir with which it is connected are ordinarily formed of ferric metal, which is readily corroded by contact even with substantially pure water, whereas, the aforesaid mineral matters in the water have a corrosive action upon the screw threads of the spreader and reservoir which are interengaged; causing them to swell as a consequence of their oxidization; so that it is sometimes necessary to break the spreader into fragments at said joint to remove it.

Therefore, the object and effect of my invention is to lessen and practically eliminate the excessive costs for the heater repairs above contemplated, by interposing at said joint, a metal member which is not only resistant to corrosion but soft, and fusible at a low temperature; so that it may be readily removed, either by unscrewing it or by melting it, to permit the immediate removal of the spreader.

In the preferred form of my invention hereinafter described; there is interposed between the ferric metal of the spreader and the ferric metal of the water reservoir; a tubular sleeve formed principally of lead but containing a small percentage of antimony and which may be readily melted and cast in the desired form with sharp screw threads upon it, without cost for machining the latter, and which may be as readily remelted to permit the instant release and separation of the parts between which it is interposed.

My invention includes the various novel features of construction and arrangement hereinafter more definitely specified.

In the drawings: Fig. I is a vertical sectional view of a gas water heater of the thermostatically controlled type aforesaid with a convenient embodiment of my invention embodied therein.

Fig. II is a top plan view of the water spreader and its appurtenances indicated in Fig. I, but on a larger scale.

Fig. III is a vertical sectional view of said spreader and its appurtenances taken on the line III, III in Fig. II in the plane of section of Fig. I and showing the fusible alloy sleeve interposed between said spreader and the reservoir.

Fig. IV is a side elevation of a peculiar form of wrench for removing and replacing my improved spreader.

Fig. V is a diametrical vertical sectional view of said sleeve indicated in the preceding figures but in its initial normal form, before it is deformed by the compression which is incident to its use in the manner described.

In said figures; the water container comprises the cylindrical metal shell 1, having the cold water inlet 2 and hot water outlet 3 at the top thereof, and the combustion chamber 5 at the bottom thereof. The diaphragm 6 forms the bottom closure of the water space 7 in said container 1, and the top of said combustion chamber. The flue 10 has its lower end connected with said diaphragm 6, and extends to the outer atmosphere, through said water container, parallel with, but eccentric to, the axis of said container shell 1.

The hollow oblate water spreader 11 is mounted in eccentric relation with said diaphragm 6 and extending below the latter in said combustion chamber; having at its upper portion, in coaxial relation, an externally screw threaded neck flange 12 surrounded by the internally and externally screw threaded fusible metal sleeve 13 extending in a corresponding opening surrounded by the flange 14 in said diaphragm 6. Said spreader has, in coaxial relation therewith, but eccentric to said container, the socket 15, engaged with the lower end of the hot water riser pipe 16 which terminates in spaced relation with the top of said container shell 1. Said spreader also has two diametrically spaced cold water inlet nozzles 17, at respectively opposite sides of said socket 15 and in communication with the water space 7 through said spreader neck 12.

The water drain pipe 18 extends from the bottom of said spreader 11 to the exterior of said combustion chamber 5 where it is provided with the drain cock 19, through which sediment may be withdrawn from said spreader. The collar 20 encircles said drain pipe 18, and is provided with the set screw 21 to secure it in adjusted position. The gas burner includes the hollow horseshoe-shaped body 23, having the radially extending cross bars 24 forming axial bearings 25 embracing said drain pipe 18 and resting upon said collar 20. The mixing tube 26 extends from said burner body 23 in eccentric tangential relation thereto but in diametrical relation with said container 1 and combustion chamber 5, as best shown in Fig. II, and is slip fitted over the gas supply tube 27. The arrangement is such that said burner may be readily withdrawn and replaced laterally with respect to said pipe 18 and collar 20 which support it.

As shown in Fig. I, the gas conduit 30 leading to said burner 23 has the automatically, thermostatically, operative valve 31, arranged to control it in accordance with the expansion and contraction of a thermostatic element in the tube 32 which is rigidly connected with said valve. Said tube 32 extends diametrically in the water space 7 in said container shell 1, between said flue pipe 10 and hot water riser pipe 16, and said valve 31 and tube 32 are detachably connected with said container shell 1 by the screw thread on the valve casing engaging the spud 33 in said shell.

I also find it convenient to provide said gas supply conduit 30 with the manually operative stop cock 34 leading to said conduit 27 between said automatic valve 31 and said burner 23; and also to provide the manually operative needle valve 35 in said conduit 27 between said stop cock 34 and said burner 23, to control the effective area of the gas inlet port within said conduit 27.

I provide said water container and combustion chamber with the heat insulating casing including the exterior shell 38 in concentric spaced relation with said container shell 1, and refractory porous lining 39 for the same forming a cylinder filling the space between said shells 1 and 38. Said heat insulating casing includes the metallic top cover 40 having a refractory lining 41, and the base cover 42 having the opening 43 in coaxial relation with said water container shell 1; affording access to the combustion chamber 5 to permit the operator to normally adjust and clean said burner 23 and to also remove and replace said spreader 11, as above contemplated.

However, if the burner 23 remains thus exposed; a considerable volume and pressure of gas would be required to maintain it lighted; whereas, I find that the desired temperature of the stored water can be maintained by the combustion of gas at such a slow rate that it would be impossible to thereby continuously maintain the flames 44 at said burner, if the latter were exposed to any air draft.

Therefore, I provide a heat insulating closure for said opening 43, including the annular metal frame 45 containing the lining 46 of porous refractory material. Said closure 45 is detachably connected with said base 42 by the clip 48 which is stationary upon said casing cover 42, and the slide catch 49 which is mounted to reciprocate through the stationary bight 50 upon said casing cover 42, diametrically opposite to said clip 48. Said base 42 has flanged plates welded thereon to detachably engage the legs 53.

Said heater mechanism operates as follows: Said catch 49 being withdrawn and said bottom closure 45 removed to afford access to the combustion chamber 5, and said needle valve 35 being retracted to permit the passage of gas to the burner 23; the gas is turned on by opening the stop cock 34 to the position shown in Fig. I, and the gas ignited at the outlets in the top of said burner 23 to form the flames 44. Thereupon, said closure 45 is replaced and secured as indicated in Fig. I, and, by the operation of the thermostatic element 32, affected and effected by changes in the temperature of the water in the container chamber 7; more or less gas is permitted to pass through said supply conduit 30 and the valve 34 and around the valve 35 to said burner 23 to heat the water in said spreader. The air necessary for combustion of said gas is let in to the chamber 5, only through the minute pores of said lining 46 and interstices at the junctions of said closure 45 with said outer casing cover 42; so that small flames 44 may be continuously maintained upon said burner 23 in an atmosphere which is undisturbed by any air draft. Owing to the oblate form of said spreader 11, the hot water rises within it to the top thereof and flows upwardly through the riser 16 into the upper part of said container chamber 7; displacing a corresponding volume of cold water which flows downwardly through said spreader neck 12 and nozzles 17 into contact with the hot lower wall of said spreader, thus circulating the water from said container 1 through said spreader until the desired temperature thereof is reached and maintained.

Of course, said thermostatically controlled valve 31 operates to gradually diminish the volume of gas permitted to pass therethrough in accordance with the rise in temperature of the water in said space 7 until the minimum is reached which will maintain the desired temperature of the stored water under normal conditions. Under such conditions, the gas flames 44 remain continuously lighted in said burner 23, although they fluctuate in height in accordance with the volume of gas being consumed which, of course, depends upon the rate at which water is drawn from the space 7 with consequent lowering of the temperature thereof by the influx of cold water through the pipe 2.

Therefore, the construction and arrangement above contemplated are such that said heater might be thus continuously operated, automatically, if it were not for the continuously augmented incrustation of the interior of said spreader 11 by deposition of mineral matter from the water being heated and, as above noted, it may be necessary to remove and replace such spreader at intervals as short as six weeks.

In order to remove said spreader; it is of course, first necessary to shut off the water supply coming through the pipe 2 and to drain the water space 7 through the valve 19. Thereafter, said valve may be removed and access afforded to the combustion chamber 5 by removal of the closure 45. Said closure 45 being released by withdrawing the slide catch 49 outwardly; said closure may be then released from the clip 48 and removed. Removal of the burner 23 may then be effected without removal of any of the pipe connections, by merely shifting said burner to the left in Fig. I far enough to release the outer end of the mixing tube 26 from the gas supply tube 27. Said burner may then be partly turned around said drain pipe 18 and withdrawn from the latter.

Although said spreader 11 may then be unscrewed by any convenient means, I find it convenient to employ the wrench shown in Fig. IV, which includes the cup shaped disk 56 having the annular flange 57 which is slightly larger in internal diameter than the external diameter of the spreader 11 and which has a circular series of bayonet slots 58 adapted to receive and engage the circular series of lugs 60. Said lugs are conveniently cast upon said spreader 11 so as to radially project at the perimeter thereof. Said wrench disk 56 has the tubular shank 62, which is large enough to slip over the drain pipe 18, collar 20 and the lower cylindrical portion of said spreader 11, and said shank has holes 63 drilled therethrough at right angles to detachably receive the cross bar 65 by which the entire wrench may be turned. Said wrench being inserted through the opening 43 in the base of the heater casing, and engaged with the spreader lugs 60, may be turned to unscrew said spreader and its sleeve 13 from the internally screw threaded flange 14 of the heater diaphragm 6, if said sleeve 13 adheres to the spreader neck 12, as is usually the case. However, if said sleeve adheres to the screw thread in the annular flange 14 in the diaphragm 6, it may be readily melted and permitted to run out by application of an ordinary portable gas blast burner.

As shown in Fig. V, said sleeve 13 is primarily a tube having a straight cylindrical inner surface provided with a straight screw thread 67, but having a conical outer surface provided with a tapered screw thread 68 adapted to fit the screw thread in said flange 14 in the diaphragm 6 which is of the Briggs standard tapered form for pipe fitting. However, the screw thread on the spreader neck flange 12 terminates above the shoulder 69 on said spreader so that when a sleeve 13 is initially screwed thereon, without distortion, it comes to rest with its lower end above said shoulder, say, to the extent of one-eighth of an inch, but, when forced into the position shown in Fig. I, by rotation of the spreader 11, said sleeve 13 is stretched and deformed until it comes down upon said shoulder 69 of the spreader, tightly gripping the screw thread on said spreader neck 12. Therefore, said sleeve 13 being of soft ductile metal, forms a packing which is compressible and deformable in the assembling of the parts so as to readily form a water-tight joint between said neck 12 and flange 14, without the extreme torsional stresses which are necessary to form a water-tight screw joint between ferric metals, as heretofore.

In other words, my invention not only avoids the difficulties heretofore experienced in effecting repairs due to corrosion of the ferric metals in direct contact with each other, but permits the formation of a better joint at less expense, both primarily in the assembling of the water heater, and thereafter in the repeated repairs of the latter.

I prefer to form such pipe fitting sleeves 13, as above described, of soft metal alloy including antimony, because the latter has the property of increasing in volume from the liquid fused state to the rigid cold state and imparts that property to the alloy, so that the latter when cast in a mold expands as it cools and presses itself into the crevices of the mold and consequently is capable of forming sharper screw threads than an alloy which shrinks upon cooling. Moreover, although I prefer to form the above contemplated bodies of low fusible metal independently of the ferric metal members between which they are to be interposed, they may be cast directly upon and in connection with either the male or female ferric member, and may be secured upon either of such members without being screw threaded, as the swelling of the softer metal, above contemplated, causes it to grip the harder metal member with such force as to retain its position under the stresses to which it may be subsequently subjected. However, I do not desire to limit myself to a metal having such capacity to swell upon cooling, as the form of the sleeves 13 herein disclosed is such that any ductile metal thus formed would be compressed to form a tight joint by the operation of assembling the ferric metals between which it is interposed. Moreover, instead of forming the interposed soft metal member independently of the hard metal members, as above described, the hard metal members may be assembled in the desired relation and the soft metal member cast between them in a fused state to form the joint.

Therefore, I do not desire to limit myself to the precise details of construction and arrangement herein set forth, as it is obvious that various modifications may be made therein without departing from the essential features of my invention, as defined in the appended claims.

I claim:

1. In a gas water heater; the combination with a casing, including an outer shell having a diaphragm intermediate of the length thereof forming a water container above said diaphragm and a combustion chamber below said diaphragm; said diaphragm having an axial opening surrounded by a flange provided with an internal screw thread; of a spreader comprising a hollow casting having an axial tubular neck adapted to extend within said diaphragm opening, in spaced relation with the walls thereof; an annular shoulder on said spreader below said neck; a sleeve of a fusible metallic alloy, fusible below 800° F., softer than said diaphragm and spreader, and having an internal screw thread fitted to said spreader neck and an external screw thread fitted to said diaphragm flange; the internal screw thread in said sleeve being straight and the external screw thread being tapered to a pipe standard; whereby relative rotation of said spreader and diaphragm to assemble them deforms said sleeve into contact with said shoulder on the spreader and into contact with said screw thread in said diaphragm flange, forming a water tight joint; said joint being readily disconnected by reverse relative rotation of said spreader and diaphragm and or by fusing said sleeve.

2. In a gas water heater; the combination with a casing, including an outer shell forming a water container above a burner; said container having a bottom opening provided with an internal screw thread; of a spreader comprising a hollow casting having an axial tubular neck adapted to extend within said opening, in spaced relation with the walls thereof; an annular shoulder on said spreader below said neck; a sleeve of metallic alloy, fusible below 800° F. softer than said container and spreader and having an internal screw thread fitted to said spreader neck and an external screw thread fitted to said container opening; the internal screw thread in said sleeve being straight and the external screw thread being tapered to a pipe standard; whereby relative rotation of said spreader and container to assemble them deforms said sleeve into contact with said shoulder on the spreader and into contact with said screw thread in said container, forming a water tight joint; said joint being readily disconnected by reverse relative rotation of said spreader and container and or by fusing said sleeve.

3. In a gas water heater; the combination with a casing, including an outer shell forming a water container above a burner; said container having a bottom opening provided with an internal tapered screw thread; of a spreader comprising a hollow casting having an axial tubular externally screw threaded neck adapted to extend within said opening, in spaced relation with the walls thereof; an annular shoulder on said spreader below said neck; a sleeve of metallic alloy, fusible below 800° F., softer than said container and spreader and having an internal screw thread fitted to said spreader neck thread and an external screw thread fitted to enter said container opening, but primarily larger, at its outer end, than said opening; whereby relative rotation of said spreader and container to assemble them deforms said sleeve into contact with said shoulder on the spreader and into contact with said screw thread in said container, forming a water tight joint; said joint being readily disconnected by reverse relative rotation of said spreader and container and or by fusing said sleeve.

4. In a gas water heater; the combination with a water container, above a burner and having an opening provided with an internal screw thread; of a spreader comprising a hollow body having a tubular externally screw threaded neck adapted to extend within said opening, in spaced relation with the walls thereof; a sleeve of low fusible metallic alloy, fusible below 800° F., softer than said container and spreader, and having an internal screw thread fitted to said spreader neck thread and an external screw thread fitted to said container opening, but primarily larger, at its outer end, than said opening; whereby relative rotation of said spreader and container to assemble them compresses said sleeve between said container and spreader, forming a water tight joint; said joint being readily disconnected by reverse relative rotation of said spreader and container and or by fusing said sleeve.

5. An article of manufacture, formed of soft metal having a fusing point below 800° F., adapted to form a conduit joint, and consisting of a conical body having a cylindrical opening therethru; and having a tapered screw thread at its conical surface, and a cylindriform screw thread at its cylindriform surface.

In testimony whereof, I have hereunto signed my name at Conshohocken, Pennsylvania, this 29th day of March, 1926.

VICTOR MAUCK.